United States Patent [19]

Guillon

[11] Patent Number: 4,970,102

[45] Date of Patent: Nov. 13, 1990

[54] WEATHER STRIPPING, PARTICULARLY FOR THE MOVABLE GLASS OF AN AUTOMOTIVE VEHICLE

[75] Inventor: Henri Guillon, Vaux-sur-Seine, France

[73] Assignee: Hutchinson, Paris, France

[21] Appl. No.: 348,974

[22] Filed: May 9, 1989

[30] Foreign Application Priority Data

May 16, 1988 [FR] France .............................. 88 06520

[51] Int. Cl.$^5$ .............................................. E06B 7/16
[52] U.S. Cl. ...................................... 428/122; 49/490; 49/498; 296/93; 428/358
[58] Field of Search .................. 428/122, 358, 31; 296/93; 49/495, 497, 498, 490

[56] References Cited

U.S. PATENT DOCUMENTS

| | | | |
|---|---|---|---|
| 3,706,628 | 12/1972 | Azzola | 49/495 X |
| 4,041,207 | 8/1977 | Takada et al. | 428/36.8 X |
| 4,133,927 | 1/1979 | Tomoda et al. | 428/422 X |
| 4,411,938 | 10/1983 | Madonia et al. | 428/31 |
| 4,442,156 | 4/1984 | Yamaguchi | 428/142 |
| 4,643,923 | 2/1987 | Bernitz et al. | 428/122 X |
| 4,701,376 | 10/1987 | Hermann et al. | 428/122 X |
| 4,813,184 | 3/1989 | Weimar | 49/498 X |
| 4,904,508 | 2/1990 | Madonia | 428/121 X |

FOREIGN PATENT DOCUMENTS

| | | | |
|---|---|---|---|
| 191381 | 2/1987 | European Pat. Off. | |
| 2517011 | 5/1983 | France | |
| 2588035 | 4/1987 | France | |
| 2110281 | 6/1983 | United Kingdom | 428/122 |

*Primary Examiner*—Henry F. Epstein
*Attorney, Agent, or Firm*—Bell, Seltzer, Park & Gibson

[57] ABSTRACT

Weather stripping is provided for a movable surface, more particularly an automotive vehicle window, comprising at least one lip or profiled member intended to come into contact with the movable surface and which is partially coated with a material promoting sliding, wherein said material is disposed at least over the active portion of said profiled member, in a plurality of separate zones defining a discontinuous layer on the cross section of the weather stripping.

17 Claims, 3 Drawing Sheets

WEATHER STRIPPING, PARTICULARLY FOR THE MOVABLE GLASS OF AN AUTOMOTIVE VEHICLE

BACKGROUND OF THE INVENTION

The invention provides weather stripping, particularly for the movable glass of an automotive vehicle.

In numerous constructions, weather stripping is already known for an automotive vehicle window or glass, mounted fixedly on the frame or chassis of the door of the vehicle which it equips and known under the namer of "window slide " when it forms the upper and side frame of the bay which is opened or closed by said movable glass, whereas it is known as "bottom glass sealing profile"0 or "lickers", when it is provided on the lower edge of said bay. Although the lickers, like the slides, provide the required water tightness, on the one hand, and contribute to the sound proofing, on the other, they have nevertheless different functions, the slides having a guide and protection role which is not required of the lickers which contribute to the aesthetic appearance of the vehicle.

In order that the slides or lickers may carry out their function, they have already been provided with a sealing part, made from natural or synthetic rubber, carried by a gripping part having possibly a reinforcement, the sealing part being applied with deformation against he movable surface with which it is to cooperate.

However, since the application of such a sealing part against a window or glass of an automotive vehicle tends to brake the sliding thereof, it has been proposed to cover the surface of the sealing part which is in contact with the glass with a layer of polyolefin of polytetrafluoroethylene or another material having good sliding properties (see for example EP-A-O 191 381 or US-A-4 442 156). The results obtained are however not entirely satisfactory, neither from the point of view of sealing when the coating deposited is fairly thick so as not to be totally eliminated during the life of the vehicle, or from the point of view of wear of the coating when it has been made sufficiently thin so that the seal fulfill its weather sealing function.

SUMMARY OF THE INVENTION

Consequently the invention provides weather stripping, particularly for the movable glass of automotive vehicles which, while providing good water tightness and good sound insulation, offers no resistance to the movement of the window and so may under normal conditions of use remain permanently during the whole life of the vehicle which it equips.

Another object of the invention is to provide such weather stripping whose manufacture does not require special finishing operations and which thus is simple and economic to produce.

For this, weather stripping for a movable surface in accordance with the invention, comprising at least a sealing part or profiled member intended to come into contact with the movable surface and which is partially coated with a material promoting sliding, is characterized in that said material is disposed at least over the active portion of said sealing part or profiled member, in a plurality of separate zones defining a layer formed of discontinuous strips over the cross section of the weather stripping.

In another characteristic of the invention, the surface of the sealing part or profiled member the closest to the movable surface is indented between the successive zones of said discontinuous layer.

According to another characteristic of the invention, more particularly adapted to a seal used as weather-tight profile for the movable glass of an automotive vehicle, the portion of the sealing part or profiled member which is not covered by said discontinuous layer is fast with a body for fixing to the bay of the window, the profiled member being possibly made from materials having different rigidity and hardness.

According to another characteristic of the invention, which finds an application more particularly in the case of a tubular profiled member, the internal surface of the profiled member has an indentation substantially opposite a zone of said preceding layer, said indentation of the internal surface of the profiled member is situated substantially opposite the middle of said layer.

According to another characteristic, possibly combined with the preceding ones, one at least of the ends of the profiled member comprises an indentation on its external surface.

According to another characteristic, combined with the preceding one, one at least of said ends comprises a swelling on its internal surface.

According to yet another characteristic combined with the preceding one, the profile of said indentation of the end of the profiled member is parallel to that of said swelling so that the thickness of the profiled member is not reduced at the level of the indentation.

In one embodiment of the weather stripping of the invention intended to form a slide for the movable glass of an automotive vehicle, the body for fixing to the bay of the window is extruded from an elastomer material of a greater hardness than that which is coextruded therewith and with the material having good sliding properties so as to form at least the sealing part or sealing parts of the weather stripping.

The discontinuous layer is advantageously made from polytetrafluoroethylene or polyolefin either by coextrusion with the weather strip assembly, or by dipping or spraying with masking or pre-treatment of the zones which do not have to be covered.

Thus, a calibrated slide is obtained directly, and without it being necessary to provide finishing operations, which can be simply and reliably positioned in the chassis of the door which it is intended to equip.

BRIEF DESCRIPTION OF THE DRAWINGS

Other features and advantages of the invention will be clear from the following description given by way of example with reference to the accompanying drawings in which.

DESCRIPTION OF THE PREFERRED EMBODIMENTS

Figure 1:
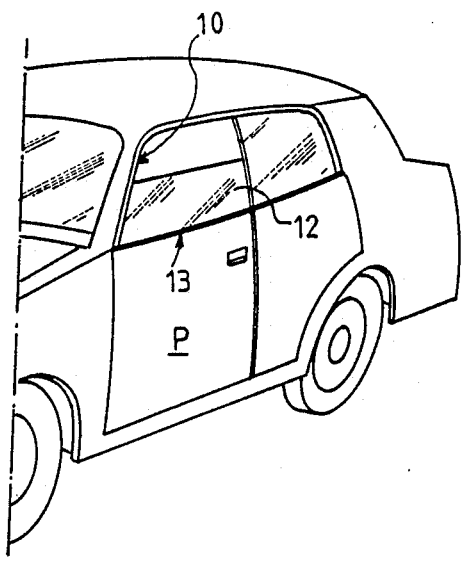
FIG. 1 is a partial view illustrating an automotive vehicle body part.
Figure 2:
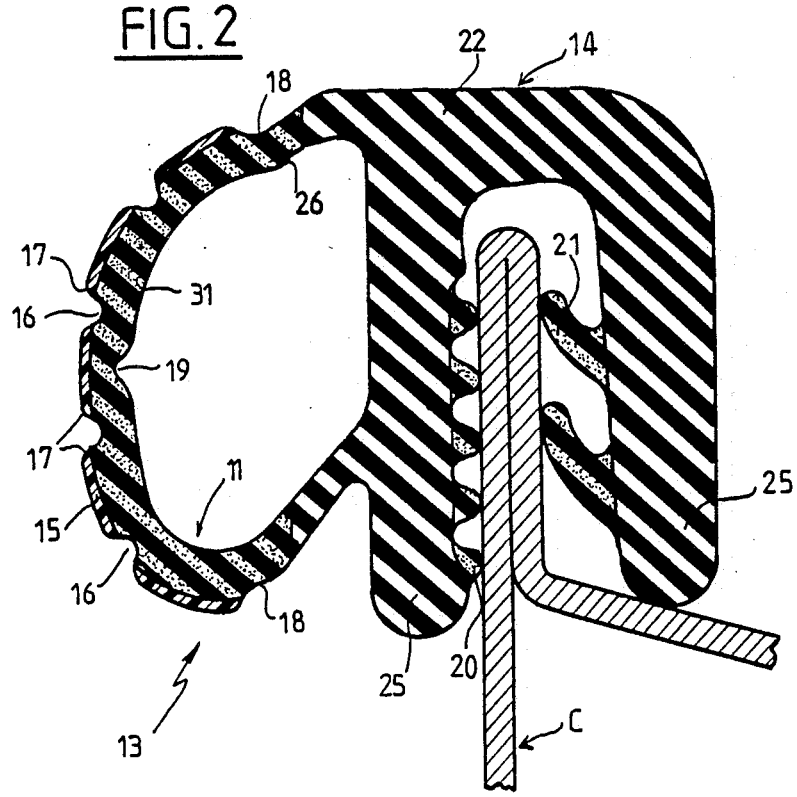
FIG. 2 is a cross sectional view of a first embodiment of weather stripping in accordance with the invention in the absence of a window.
Figure 3:
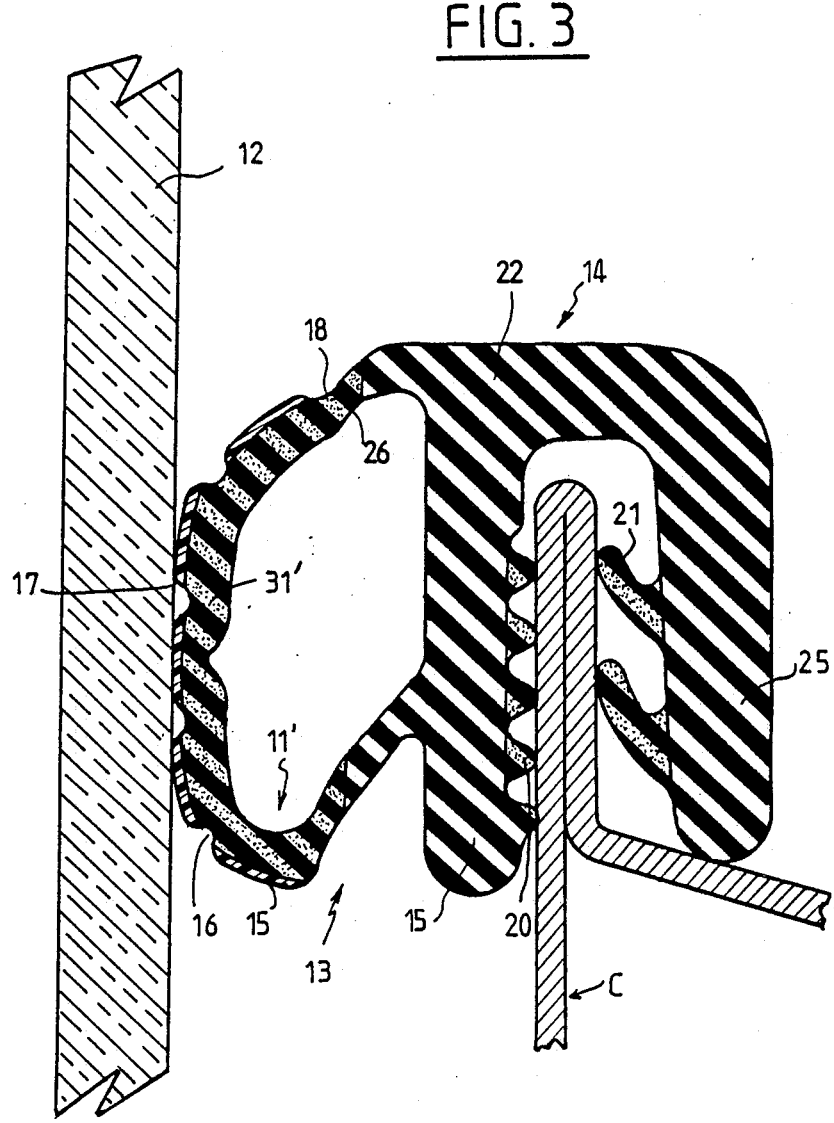
FIG. 3 is a cross sectional view of the same weather stripping fitted in the window bay, the window being in position.

Reference is made first of all to FIGS. 1 to 3, in FIGS. 2 and 3 of which the same references designate the same elements, the "prime" index referring to the elements deformed by the presence of the window.

A seal or weather strip designated as a whole by the reference 13 is here provided at the lower part of the window bay 10 of an automotive vehicle door, adapted to be closed by a sliding window or glass 12, FIG. 1, said window or glass being guided laterally by window slides (not shown) and being adapted to cooperate with an upper slide extending substantially parallel to the weather stripping licker 13. The latter comprises essentially a tubular profiled sealing member 11, 11' of a generally sealing particle cross section, one part of which is fast with a body 14, having a general pi ($\pi$) cross section. Substantially parallel arms 25 of body 14 are joined together by a cross piece 22, arms 15 and 25 having on their opposite face, respectively, projections or ribs such as 20 or 21 for fixing to the frame or chassis C of door P. Body 14 may be reinforced by a U shaped section, advantageously made from metal, for example from aluminium, which is embedded in the mass of the material forming the section, said material being possibly an elastomer material such as rubber, or a plastomer material such as PVC.

Within the scope of the invention, the section may be formed, not from a single material, but from materials differing from each other by certain of their properties, for example their hardness, the body 14 then being preferably made from a material having a greater hardness than the projections or ribs 20, 21 and than the active portion 31, 31' of the profiled member in contact with the window, which active portion is made from a sufficiently flexible resilient material for accommodating possible flatness defects of the window.

In accordance with the invention, a discontinuous layer 15 of a material having good sliding properties, such as polytetrafluoroethylene or a polyolefin, is deposited on the active portion thereof, in the form of strips extending longitudinally over the whole length of the weather stripping, the strips being separated from each other.

Between the different strips forming the discontinuous layer 15, the external surface of the profiled member which is the closest to the window advantageously comprises depressions or indentations 16 promoting the deformation of the active portion of the weather stripping required for sealing and in addition playing a role of dust accumulation pocket, thus preventing such dust from scratching the window during its movement. The side edges, such as 17, of the strips of layer 15 advantageously have an effect of removing materials not as hard as the window which accumulate and adhere to the latter, frost for example. The external surface of the active portion 31 in the vicinity of its connection to body 14 is slightly indented at 18 which, by increasing its flexibility, further improves its adaptation to possible unevenness of the surface of the window. Such adaptation is also improved by the indentation 19 formed on the internal surface substantially opposite the middle of the central strip of layer 15. Other indentations may be provided opposite the other strips or elements of the layers, depending on the desired degree of flexibility and the nature of the material forming the portion 31. A swelling 26 on the internal surface of the active portion 31, opposite the upper indentation of the weather stripping, increases the resistance of the connection of the active portion 31 to the body 14 to an extend required for withstanding the force exerted by the window during its downward movement, whereas the continuity of the internal section at the bottom of the profiled sealing member provides a better damping effect for the raised window. The internal face of the profiled sealing member, on the body side, is not necessarily flat but the embodiment illustrated has the advantage of being simpler to manufacture. The different indentations are advantageously formed during extrusion, coextrusion or molding if one of these techniques is used for manufacturing the whole of the weather stripping, but they may also be carried out after manufacture thereof.

Splitting up of layer 15 may obviously be different from that illustrated, not only in so far as the number of coated zones or strips is concerned but also their width.

Polyolefins, polytetrafluoroethylene and other materials known for their good sliding and wear resistant properties are advantageously used for forming layer 15, positioned for example by coextrusion with the material or materials forming the parts of the weather stripping, or by molding. It may of course be obtained by any other appropriate method, such as dipping, spraying, etc. . . with for example masking or anti-adherent pre-treatment of the zones of the surface not to be coated, without departing from the scope of the invention.

Figure 4:
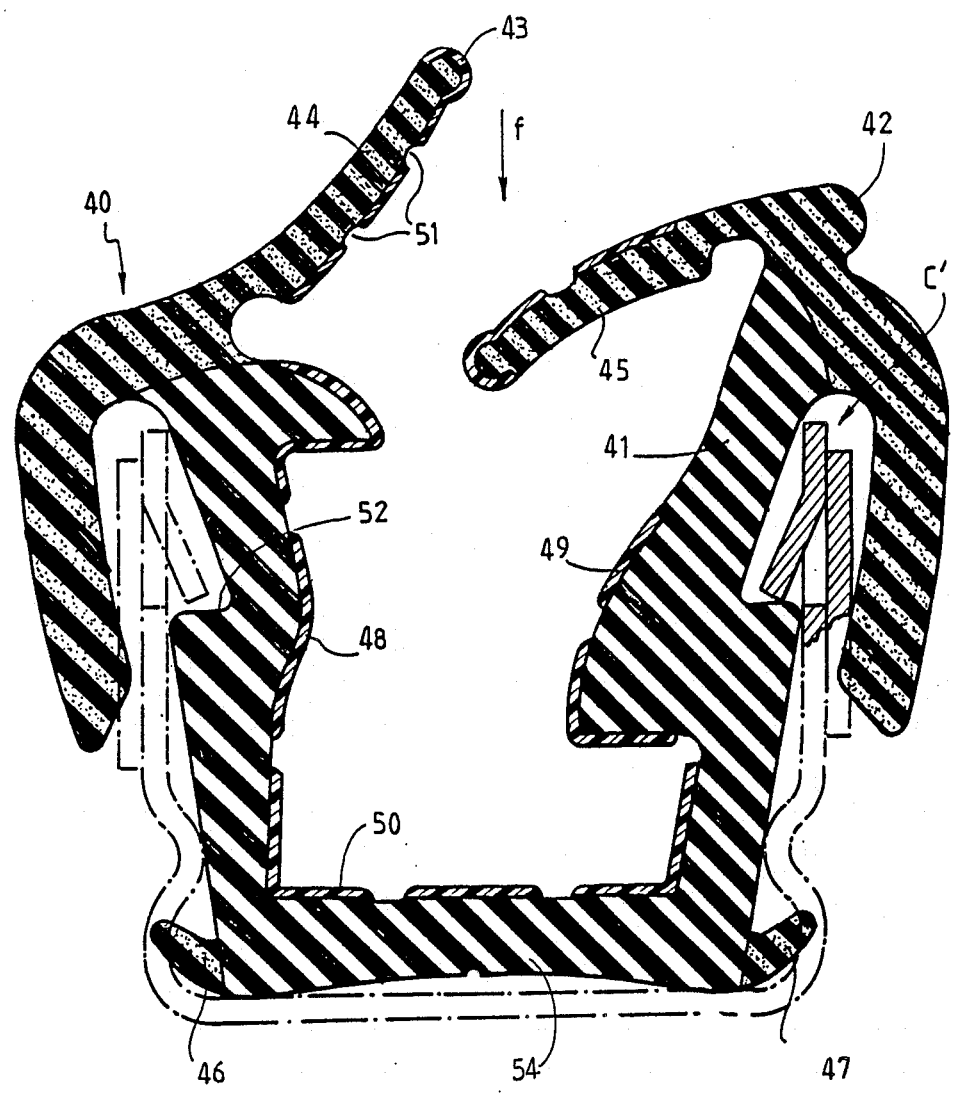
FIG. 4 is a schematic cross sectional view of another embodiment of weather stripping in accordance with the invention for forming a slide for the movable glass of an automotive vehicle.

Reference will now be made to FIG. 4 illustrating schematically one embodiment of weather stripping in accordance with the invention in its application as a slide for the movable glass of an automotive vehicle. In this embodiment, weather stripping 40 is manufactured by coextrusion of a U-shaped body 54 made from a relatively hard material shown at 41, a material of lower hardness shown at 42 and the discontinuous layer 43 from a material having good sliding properties, the indentations of said layer promoting the deformation of the active portions of the weather stripping being shown at 51. More precisely, body 54 with a generally U shaped cross section is made from an elastomer material with a hardness which may for example be Shore D 50, whereas material 42 forming the sealing parts 44 and 45 is made from a Shore A elastomer, this same material being the one forming the projections 46 and 47 extending on each side of the base of the U shaped body 54. In this embodiment, the material of discontinuous layer 43 having good sliding properties, and which may be one of those mentioned above in connection with FIGS. 2 and 3, is also added to certain portions of the arms of the body as shown at 48 and 49 as well as on the bottom of the body as shown at 50. For positioning the weather stripping 40 on the frame or chassis C' of the door, said weather stripping 40 is simply fitted in the direction of arrow f body 44, although generally rigid, is sufficiently deformable to pass over the pressed out portions then to resume the shape and position shown in the drawings in which said pressed out portions, cooperating with shoulders 52 of the flanges of the body, oppose inopportune removal thereof.

The projections 46 and 47, which are more readily deformable, contribute to correct positioning of the slide for they are made from a less rigid material than that of the body, said projections being deformed from their condition shown in the drawings and which is that prior to the introduction of the slide into chassis C'.

What is claimed is:

1. Weather stripping for a movable surface comprising at least one profiled sealing member, said sealing member including an active portion having an external surface intended to come into contact with said movable surface, a coating material promoting sliding, said coating material being disposed at least over said external surface of said active portion of said profiled member in a plurality of separate zones defining a discontinuous layer wherein the zones containing said coating material are separated by areas substantially free of said material.

2. The weather stripping as claimed in claim 1, wherein said external surface of said profiled member has indentations between at least one of said separate zones of said discontinuous layer.

3. The weather stripping as claimed in claim 1, wherein said movable surface is a surface particularly for the movable glass of an automotive vehicle having a bay within which said glass slides, and said weather stripping includes a body adapted to be fixed to said bay, a portion of said profiled member not coated with said discontinuous layer being fast with said body, and being formed of a material having a hardness and/or rigidity equal to or different from that carrying said discontinuous layer.

4. The weather stripping as claimed in claim 1, wherein said profiled member is tubular and the internal surface thereof has an indentation substantially opposite a zone of said layer and substantially opposite the middle of said layer.

5. The weather stripping as claimed in claim 4, wherein at least one of the ends of the profiled member has an indentation on its external surface.

6. The weather stripping as claimed in claim 5, wherein said one at least of said ends of the profiled member has a swelling on its internal surface.

7. The weather stripping as claimed in claim 6, wherein the profile of said indentation of the end is parallel to that of said swelling.

8. The weather stripping as claimed in claim 3, wherein said body has projections extending therefrom and made from a material having a rigidity and/or hardness different from that of the rest of said body and possibly having the same rigidity and/or hardness as the portion of the weather stripping coated with said layer.

9. The weather stripping as claimed in claim 3, intended more particularly to form a slide for a movable glass of an automotive vehicle, wherein said body for fixing to the bay and said sealing member are coextruded from elastomer material, the elastomer material of said body having a greater hardness than that which is coextruded therewith and than that of said coating material.

10. The weather stripping as claimed in claim 1, wherein said material of some of said discontinuous layer is from the group consisting of polytetrafluorethylene and polyolefin.

11. The weather stripping as claimed in claim 10, wherein said discontinuous layer is made by coextrusion with another portion of said weather stripping.

12. The weather stripping as claimed in claim 1, wherein said discontinuous layer is made by dipping or spraying with masking or pre-treatment of said areas separating said zones. known as "bottom glass sealing profile"

13. Weather stripping for a movable surface, comprising:
a profiled sealing member, said sealing member including an active portion having an external surface adapted to contact said movable surface;
a discontinuous layer of a coating material, of a type facilitating sliding, disposed upon said active portion of said profiled member in a plurality of mutually spaced zones;
said active portion of said sealing member having at least one indentation within said external surface thereof at a location between two adjacent ones of said zones of said discontinuous layer of said coating material.

14. Weather stripping as in claim 13, wherein said active portion of said profiled member has a plurality of said indentations, each of said indentations extending into said exterior surface of said portion at a location between adjacent ones of said zones.

15. Weather stripping as in claim 14, wherein each of said indentations spans substantially the entire distance between thereto adjacent ones of said zones.

16. Weather stripping as in claim 13, wherein said coating material in at least one of said zones is substantially smooth-surfaced and free from indentations.

17. Weather stripping as in claim 16, wherein said coating material in each of said zones is substantially smooth-surfaced and free from indentations and protuberances.

* * * * *

UNITED STATES PATENT AND TRADEMARK OFFICE
CERTIFICATE OF CORRECTION

PATENT NO. : 4,970,102

DATED : November 13, 1990

INVENTOR(S) : Henri Guillon

It is certified that error appears in the above-identified patent and that said Letters Patent is hereby corrected as shown below:

Column 1, line 16, delete "0"

Column 3, line 15, delete "licker"

Column 3, line 17, delete "sealing particle" and insert
   -- elliptic --

Column 3, line 20, delete "15 and"

Column 6, lines 16 and 17, delete "known as "bottom glass sealing profile""

Signed and Sealed this

Fifth Day of May, 1992

Attest:

DOUGLAS B. COMER

*Attesting Officer*      Acting Commissioner of Patents and Trademarks